Dec. 26, 1944.  J. S. SOHN  2,366,068
DEVICE FOR ELECTRICALLY CONTACTING TRAVELING WELDING RODS
Filed March 17, 1944
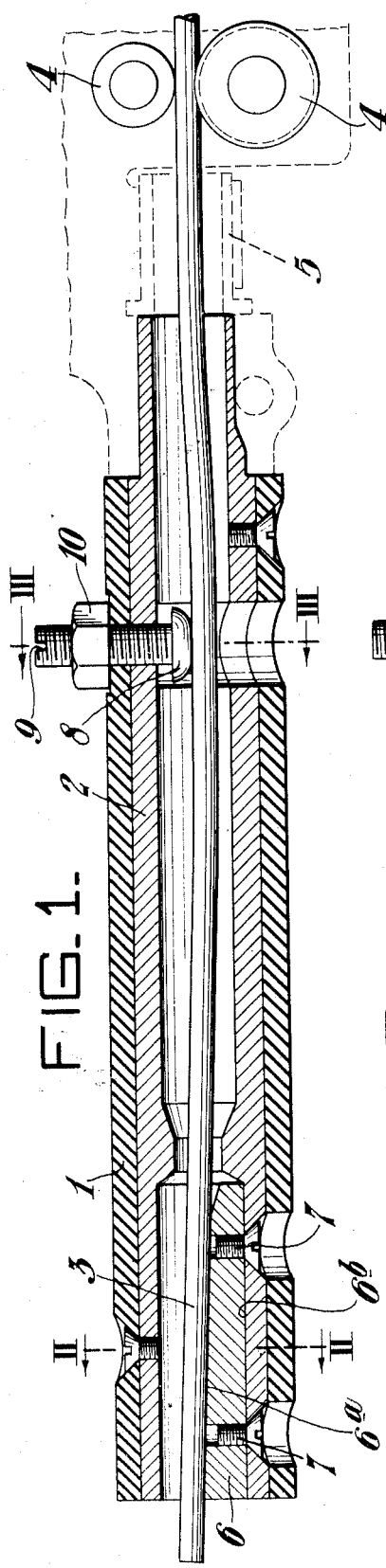
Inventor:
JESSE SUTTON SOHN,
by: John E. Jackson
his Attorney.

Patented Dec. 26, 1944

2,366,068

UNITED STATES PATENT OFFICE 2,366,068

DEVICE FOR ELECTRICALLY CONTACTING TRAVELING WELDING ROD

Jesse Sutton Sohn, Leetsdale, Pa., assignor to American Bridge Company, a corporation of New Jersey Application March 17, 1944, Serial No. 526,936

2 Claims. (Cl. 219—8)

This invention is a device for electrically contacting traveling welding rod and is intended for use in connection with automatic welding machines of the type which continuously feeds the welding rod through a terminal to the welding zone where the wire functions as the electrode during electric welding. According to the prior art the necessary electrical contact is effected by means of a contactor which is pressed against the welding rod by a spring, this practice being objectionable since heat is conducted to the spring so that it soon loses its elasticity and must be replaced. The present invention obviates this trouble.

A specific example of the described device is illustrated by the accompanying drawing in which:

Figure 1 is a longitudinal section;

Figures 2 and 3 are cross sections taken from the lines II—II and III—III in Figure 1;

Figure 4 is a segment from Figure 1 showing a modification; and

Figure 5 is an end view of Figure 4.

More specifically, the drawing shows the insulating sleeve 1 around the copper tube 2 through which the welding rod 3 is continuously fed by the feed rolls 4 of the terminal 5 into which an end of the tube 2 fits. The welding rod 3 is relatively straight, is elastic, since it is made of metal, and is relatively stiff because it is relatively thick. The prior art practice is to provide a radially movable contactor jaw, in the copper sleeve 2, which is pressed against the welding rod 3 by the spring which involves the objection that the spring soon loses its elasticity because it must operate at elevated temperatures.

In the case of the present invention, a copper contactor block 6 is solidly fixed in the exit end of the tube 2 by screws 7, this block and the feed rolls 4 providing spaced rigid supports for engaging the rod 3. The opposite side of the rod 3 is engaged by an adjustable rigid deflector 8, in the form of a round-headed screw screwed through the copper sleeve 2 and provided with an operating screw-driver slot 9 and a lock nut 10, this deflector 8 engaging the span of the rod 3 between the supports 4 and 6 and elastically deflecting the welding rod therebetween. That is to say, the span of welding rod 3 becomes a stressed beam elastically deflected by the load solidly applied by the deflector 8 and solidly supported by the feed rolls 4 and the copper contactor block 6. The result of this arrangement is that the welding rod 3 is elastically forced against the copper contactor block 6 at all times without the use of the spring, there being no danger of the welding rod losing its elasticity since it is being continuously fed into the span where it is elastically deflected. The supports 4 and 6 and the deflector 8 are all rigidly mounted so that there is nothing to get out of order even if they become highly heated. The supports 4 and 6 and the deflector 8 all permit relative travel of the rod and the support 6 constitutes an electrical contactor against which the welding rod is elastically forced by reason of its own elasticity.

The electrically conductive face of the copper contactor block 6 declines in such a manner that this face is longitudinally parallel to the deflected rod portion forced thereagainst and slidingly engaging the same. Preferably the surface of the copper contactor block 6 is grooved, as at $6^a$, so as to provide the maximum practicable area of intercontacting surfaces. The other face of this copper contactor block 6 is cylindrical, as at $6^b$, so as to fit the cylindrical inside of the copper tube 2. In the case of the modification, the copper tube is shown as having a rectangular slot $2^a$ paralleling the axis of the deflecting portion of the welding rod 3 and into which a relatively small copper contactor block 11 is fitted and retained by the screws 7.

It is to be understood that the welding circuit is established through the copper tube 2 in the usual fashion and that the feed rolls 4 are powered in the usual manner. The difference over the prior art resides in the use of the supports 4 and 6 and the deflector 8 which are all solid so that they are not put out of action by elevated temperautres, with the deflector 8 functioning to flex or bow the welding rod 3 between the supports 4 and 6 so as to utilize the elasticity of the rod itself for the purpose of establishing the necessary elastic pressure between the welding rod and the electrical contactor element.

I claim:

1. A device for electrically contacting traveling welding rod, said device including spaced rigid supports for engaging said rod and a rigid deflector for engaging the span of said rod between said supports and elastically deflecting it therebetween, said supports and said deflector permitting relative travel of said rod and at least one of either said supports or said deflector being an electrical contactor with said rod elastically forced thereagainst by reason of its own elasticity.

2. A device for electrically contacting traveling welding rod, said device including spaced rigid supports for engaging said rod and a rigid deflector for engaging the span of said rod between said supports and elastically deflecting it therebetween, said supports and said deflector permitting relative travel of said rod and at least one of either said supports or said deflector being an electrical contactor with said rod elastically forced thereagainst by reason of its own elasticity and having an electrically conductive face longitudinally parallel to the deflected rod portion forced thereagainst and slidingly engaging the same.

JESSE SUTTON SOHN.